United States Patent [19]
Chang et al.

[11] Patent Number: 5,398,325
[45] Date of Patent: Mar. 14, 1995

[54] METHODS AND APPARATUS FOR IMPROVING CACHE CONSISTENCY USING A SINGLE COPY OF A CACHE TAG MEMORY IN MULTIPLE PROCESSOR COMPUTER SYSTEMS

[75] Inventors: Jung-Herng Chang, Saratoga; Curt Berg, Sunnyvale; Jorge Cruz-Rios, San Jose, all of Calif.

[73] Assignee: Sun Microsystems, Inc., Mountain View, Calif.

[21] Appl. No.: 879,611

[22] Filed: May 7, 1992

[51] Int. Cl.⁶ ............................................. G06F 12/02
[52] U.S. Cl. ............................. 395/425; 364/DIG. 1; 364/243.41; 364/239.4
[58] Field of Search ... 364/200 MS File, 900 MS File; 395/400, 425

[56] References Cited

U.S. PATENT DOCUMENTS

| | | | |
|---|---|---|---|
| 5,148,536 | 9/1992 | Witek et al. | 395/425 |
| 5,201,041 | 4/1993 | Bohner et al. | 395/425 |
| 5,222,223 | 6/1993 | Webb, Jr. et al. | 395/425 |
| 5,228,135 | 7/1993 | Ikumi | 395/425 |
| 5,265,233 | 11/1993 | Frailong et al. | 395/425 |

Primary Examiner—Joseph L. Dixon
Assistant Examiner—Hiep T. Nguyen
Attorney, Agent, or Firm—Blakely Sokoloff Taylor & Zafman

[57] ABSTRACT

Apparatus and methods for a cache controller to maintain cache consistency in a cache memory structure having a single copy of a cache tag memory while supporting multiple outstanding operations in a multiple processor computer system. The CPU includes a small internal cache memory structure. A substantially larger external cache array is coupled to both the CPU and the CC via first, integrated address and data bus. The CC is in turn coupled to a second bus interconnecting, among other devices, processors, I/O devices, and a main memory. The external cache is subblocked. A cache directory in the CC tracks usage of the external cache. An input buffer in the CC is connected to the first bus to provide buffering of commands sent by the CPUs. An output buffer in the CC is coupled to the second bus for buffering commands directed by the CC to devices operating on the second bus. A virtual bus interface (VBI) receives entries made in the input buffer, whereafter the input buffer is relieved to accept other commands. A cache invalidation queue (CIQ) register stores addresses of cache subblocks to which incoming invalidate operations have been directed. The address of the destination device is also written to the output buffer. If the address of the destination device stored in the output buffer matches the address in the CIQ register, the CC will issue a read-invalidate command, wherein the invalidated block of cache is again filled with data corresponding to the prior-accessing processor, thus invalidating the intervening overwrite issued by the later accessing CPU. Response time to snooping requests is thereby bounded, and data consistency between cache and processor are thereby maintained.

12 Claims, 5 Drawing Sheets

METHODS AND APPARATUS FOR IMPROVING CACHE CONSISTENCY USING A SINGLE COPY OF A CACHE TAG MEMORY IN MULTIPLE PROCESSOR COMPUTER SYSTEMS

RELATED APPLICATIONS

This application is related to U.S. patent application Ser. No. 07/876,359 entitled "Methods and Apparatus for Providing Multiple Pending Operations in a Cache Consistent Multiple Processor Computer System", filed on Apr. 29, 1992.

BACKGROUND OF THE INVENTION

1. Field of the Invention

The present invention relates to the field of computer systems and associated cache memory structures. More particularly, the present invention relates to a cache controller and associated registers to maintain cache consistency during multiple overlapping cache access operations.

2. Art Background

Typically a central processing unit (CPU) in a computer system operates at a substantially faster speed than main memory. When the CPU executes instructions faster than memory can supply them, the CPU must idle until the next instruction datum upon which the instruction will operate is available. CPU idle time adversely affects system performance. To avoid unnecessary CPU idle time while awaiting data or instructions from the large main memory, a smaller cache memory capable of operating at a higher speed than the main memory is often used to buffer the data and the instructions between the main memory and the CPU. The data and instructions in memory locations of the main memory are mapped into the cache memory in block frames. Each block frame consists of a block offset corresponding to a number of memory locations storing data and instructions associated with that block. Access to a block frame of the cache is typically made via a cache directory storing physical address tags and status bits corresponding to the respective block frames.

When a cache read "miss" occurs, that is, when the datum or instruction requested by the CPU is not in the cache memory, the cache memory must retrieve the datum or instruction from the main memory. To do so, typically the entire block frame of data or instructions including the requested datum or instruction is retrieved, and the CPU idles until the entire block frame retrieval is completed. Many other cache performance problems and improvement techniques exist, the reader being referred to, for example, J. L. Hennessy and D. A. Patterson, *Computer Architecture—A Quantitative Approach*, pp. 454–61, (Morgan Kaufmann, 1990).

More recently, computer systems having multiple processors have become common, directed to increasing processing speed. In a multiple processor system, some or all of the several processors may simultaneously attempt to access the block frames stored in the cache, either for read or write purposes, and directing that data be routed to or from any of various input/output (I/O) devices. In a multiple processor (MP) system, proper system operation depends on maintaining proper correspondence of data stored in the cache with the corresponding processor, where any of several processors may access and alter cache-stored data. Correspondence of data to the proper processor is termed "cache consistency".

Previously, cache consistency in MP systems typically has been guaranteed by providing a duplicate copy of the cache directory. The duplicate directory is normally used to enable a processor on a bus interconnected to multiple processors to access information in the duplicate of the cache directory during a snoop operation without requiring access to the cache directory itself. However, with increasing cache size and, thus, increasing cache directory size, maintaining a duplicate copy of the directory can become costly in terms of actual cost and performance of the computer system.

Thus, it is desirable to provide a new approach for controlling a cache memory structure to maintain cache consistency in a computer system having multiple processors issuing multiple outstanding read and write operations in an overlapping, substantially contemporaneous fashion. It is particularly desirable if cache miss penalties are thereby reduced. It is also desirable if the hardware requirements necessary to implement the cache controller and associated control registers can be minimized.

As will be described in the following detailed description, these objects and desired results are among the objects and desired results of the present invention which overcomes the disadvantages of the prior art, and provides methods and cache memory controller for implementing a cache memory system for fetching data for a multiple-CPU computer system. The present invention reduces SRAM-intensive cache structures, while maintaining data consistency between caches and CPUs.

SUMMARY OF THE INVENTION

Apparatus and methods for a cache controller to maintain cache consistency in a cache memory structure having a single copy of a cache tag memory while supporting multiple outstanding operations in a multiple processor computer system are disclosed. The computer system includes a central processor unit (CPU) having an internal cache memory structure. A substantially larger external cache array having an appropriate number of blocks is coupled to both the CPU and the cache controller (CC) via a high speed integrated address and data bus (CPU bus). The CC is in turn coupled to a second high speed bus (MP bus) interconnecting processors, cache controllers, I/O devices, and memory devices forming a multiple processor system. The external cache is subblocked to reduce bus traffic and size of a cache directory within the CC by providing four subblocks per block.

The cache directory in the CC tracks usage of the external cache, and may be organized to support a choice of bus protocols for buses intercoupling the CC to the main memory. The cache directory consists of tag entries, each tag entry having an address field and multiple status bit fields, one status bit field for each subblock. The address field of the tag entry contains the full physical address without bits used as an index of the tag entry. Each of the status bit fields has a shared-bit, an owner-bit, and a valid-bit. In addition, each of the status bit fields has a pending-bit which, when set, indicates a pending uncompleted outstanding operation on a subblock. A set pending-bit will prevent the CPU from accessing data presently stored in the corresponding subblock. Only a single copy of the cache directory is provided.

Access to an entry in the cache directory is made via an index field contained within a CPU physical address. The CPU physical address also has a physical address tag field, subblock index, and subblock offset fields. There are provided sufficient bits in the index to uniquely access each entry in the cache directory.

An output buffer in the CC is connected to the CPU bus via a CPU command module to provide buffering of commands sent by the CPU. The output buffer in the CC also buffers commands directed by the CC and the CPU to devices operating on the MP bus. Similarly, an input buffer in the CC is coupled to the MP bus and stores incoming commands directed to the CC and the CPU. In addition, a virtual bus interface (VBI) is implemented within the CC to reduce latency of servicing commands issued from devices operating on the MP bus and directed to the CPUs operating on the integrated address and data CPU bus. The VBI receives from the input buffer commands directed to the CPU, whereafter the input buffer is again free to accept incoming commands, particularly bus snooping requests from devices operating on the MP bus.

An invalidation queue register structure is implemented in the CC to maintain consistency for shared-write, write-invalidate, and write-miss operations associated the single cache directory. After a prior-accessing CPU issues a shared-write command to a target block within the cache but prior to the time the command is sent to a destination device on the second bus, a subsequently accessing CPU issuing an invalidate command to the same block causes the address of the affected cache block to be written to the invalidation queue. The address of the cache block receiving the shared-write command is also written to the output buffer holding pending outgoing commands. When the second bus is made available to the prior-accessing CPU, the address of the destination device in the invalidation queue register structure will match the address for the pending command stored in the output buffer. The CC will then issue a read-invalidate command, thereby obtaining the most recent copy of data stored in the subblock targeted. The read-invalidate operation invalidates all valid copies of the targeted subblock, thus maintaining consistency between all caches in the multiple processor system participating in the cache consistency protocol.

BRIEF DESCRIPTION OF THE DRAWINGS

The present invention will be understood more fully from the detailed description given below and from the accompanying drawings of the preferred embodiment of the invention in which.

DETAILED DESCRIPTION OF THE INVENTION

Apparatus and methods for a cache controller to maintain cache consistency in a cache memory structure having a single copy of a cache tag memory while supporting multiple outstanding operations in a multiple processor computer system are disclosed. In the following description, for purposes of explanation, specific numbers, times, signals etc., are set forth in order to provide a thorough understanding of the present invention. However, it will be apparent to one skilled in the art that the present invention may be practised without these specific details. In other instances, well known circuits and devices are shown in block diagram form in order not to obscure the present invention unnecessarily.

Figure 1:
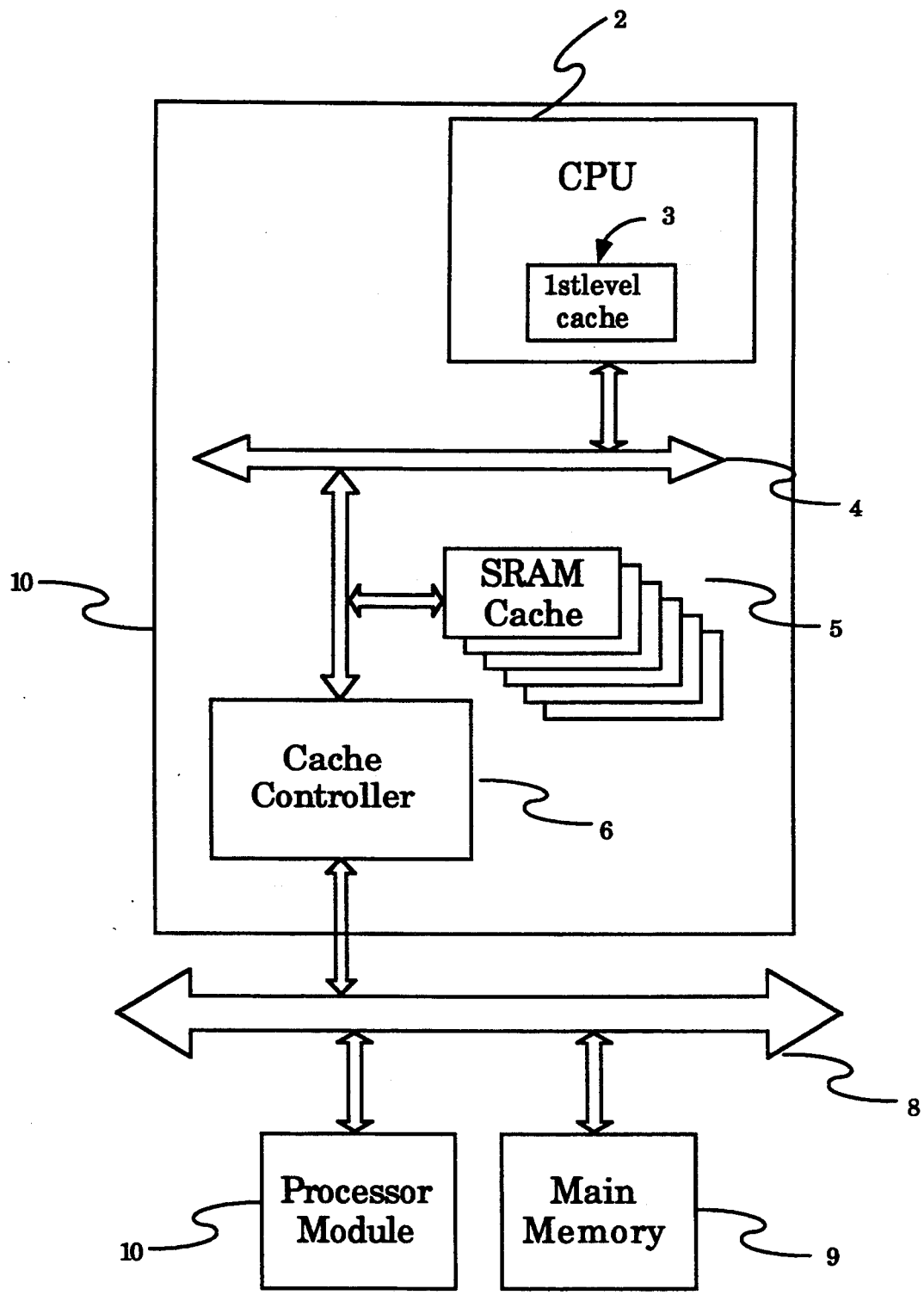
FIG. 1 is a block diagram overview of an external cache memory and a cache controller incorporating the teachings of the present invention.

Reference is now made to FIG. 1, wherein a block diagram overview of an external cache memory and a cache controller (CC) in a multiple processor high performance computer system incorporating the teachings of the present invention are shown. In FIG. 1, a central processor unit (CPU) 2 is interconnected via a CPU bus 4 to an external cache arrangement 5. Cache arrangement 5 is controlled by a cache controller (CC) 6, wherein CPU 2, CPU bus 4, cache arrangement 5 and CC 6 form a processor module 10. Processor module 10 is in turn is intercoupled via a multiple processor (MP) bus 8 to a main memory arrangement 9, and other processor modules 10. CPU 2 further has an internal cache arrangements 3. Internal cache arrangement 3 is an integrated on-chip cache structures for CPU 2, and is of substantially smaller size relative to external cache arrangement 5. Although the present invention does not impose any specific speed requirements for the memory devices forming external cache arrangement 5 and main memory 9, it is generally assumed that the devices forming cache arrangement 5 are smaller and faster than components forming main memory 9. CPU bus 4 is assumed to be of any type suitable to accommodate a high performance processor, but may, as in the case of the present invention, be optimized to operate with a particular processor architecture, in this case the Viking processor designed by Sun Microsystems, Inc., Mountain View, Calif. 94043.

Figure 2:
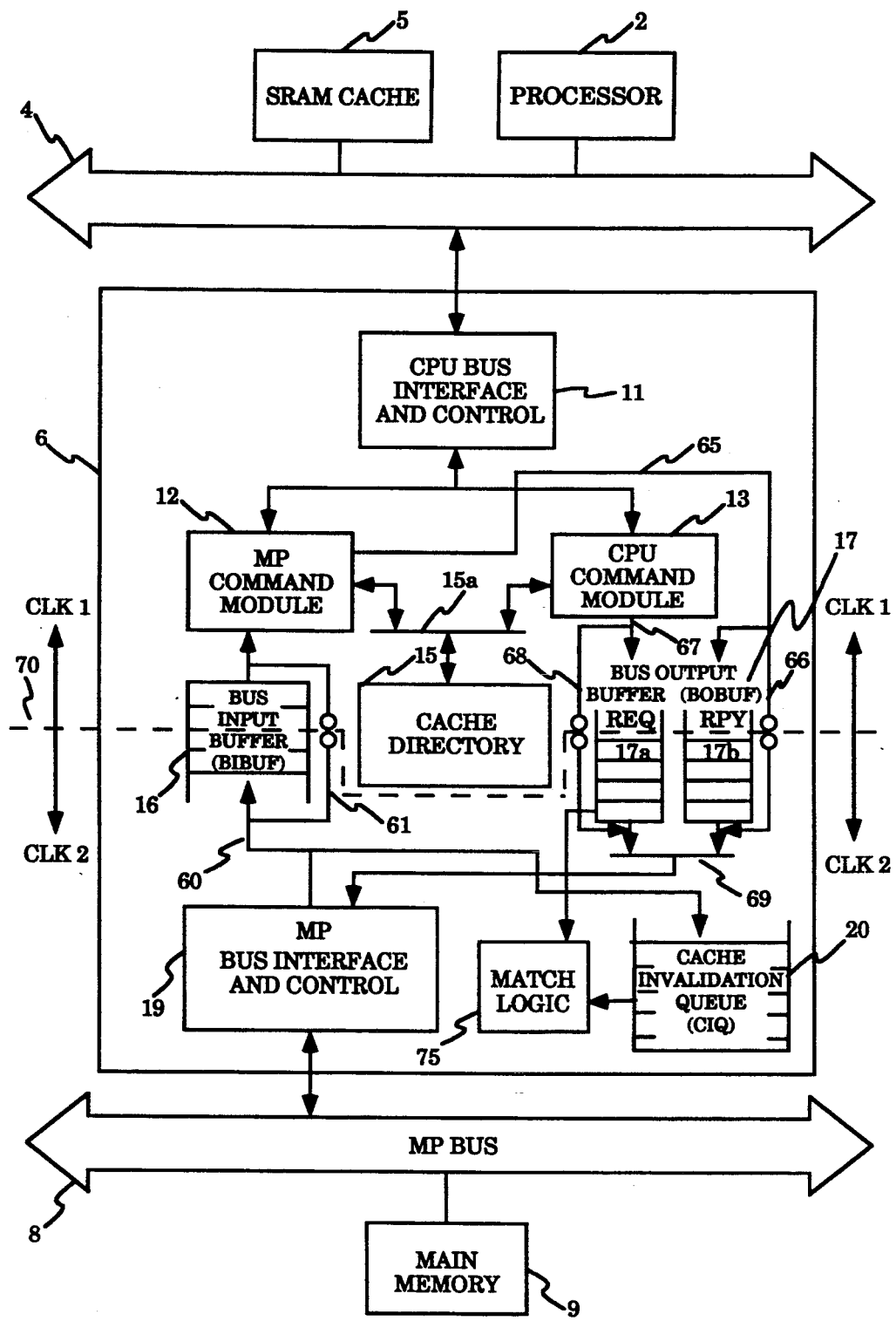
FIG. 2 is a functional block diagram of the cache controller.

Referring now to FIG. 2, a block diagram illustrating the arrangement of CC 6 is shown. In FIG. 2, the integrated address and data CPU bus 4 is connected to a CPU bus interface and control unit 11, which controls access to bus 4 in accordance with an internal arbiter (not shown). CPU bus interface and control unit 11 is connected in two-way communication with a CPU command module 13 and a multiple processor (MP) command module 12. MP command module 12 processes MP bus 8 requests and replies, and in certain cases snooping requests, sourced from MP bus 8, and replies thereto. Snooping requests will be discussed in more detail below. CPU command module 13 processes all incoming commands from CPU 2, and if necessary generates proper commands to permit CPU 2 to gain control of MP bus 8. A cache directory 15 is intercoupled to MP command module 12 and CPU command module 13 via a local internal cache directory bus 15. The structure and operation of cache directory 15 will be described in more detail below.

A bus input buffer (BIBUF) 16 in CC 6 is connected to MP bus 8 via a MP bus interface and control unit 19 to provide buffering of commands sent by devices operating on MP bus 8 to cache directory 15, and to CPU 2 operating on CPU bus 4. BIBUF 16 is also coupled to MP command module 12, thereby transmitting commands directed to CPU 2 and/or cache directory 15. Similarly, a bus output buffer (BOBUF) 17 in CC 6 is coupled to the integrated address and data CPU bus 4 via CPU bus interface and control unit 11 to provide buffering of commands directed by CPU 2 through CC 6 to devices operating on the second bus, e.g., main memory 9. BOBUF 17 is also coupled to MP command module 12, thereby transmitting replies issued by MP command module 12 and directed to devices operating on MP bus 8. BOBUF 17 consists of two buffer structures: request buffer (REQ) 17a having an input and an output, and reply buffer (RPY) 17b having an input and an output.

MP bus interface and control unit 19 is interconnected to buffers 16 and 17, and governs data communications with external devices intercoupled to CC 6 over MP bus 8. MP bus interface and control unit 19 performs functions analogous to functions performed by CPU bus interface and control unit 11. MP bus interface and control unit 19 includes a bus interface unit (not shown), and drivers and receivers (not shown) necessary to send and receive signals from CC 6 to devices intercoupled by MP bus 8, and in particular main memory 9. The features described but not shown in reference to MP bus interface and control unit 19 are widely known in the art, and do not require further discussion here.

A data line 60 is routed from MP bus interface and control unit 19 to the input of BIBUF 16. Further, a second data line 61 is routed from MP bus interface and control unit 19 around BIBUF 16 to MP command module 12. Analogously, a third data line 67 is routed from CPU bus interface and control unit 11 to the input of BOBUF 17, in particular REQ buffer 17a. In addition, a fourth data line 68 is routed from CPU bus interface and control unit 11 around REQ buffer 17a to a local data bus 69 internal to BOBUF 17. A fifth data line 65 extends from MP command module 12 to the input of RPY buffer 17b, with a sixth data line 66 routed around RPY buffer 17b to local data bus 69. The purpose of data line 66 is to permit bus snooping requests to be routed through CC 6 externally from REQ buffer 17a, without constraining the snoop requests to the command/data datapaths. Because cache 5 (FIG. 1) operates in a shared-memory environment, it is necessary that CC 6 have access to cache status information as it relates to shared blocks. As in prior art designs, CC 6 as configured in the present invention permits devices operating on either bus 4 or 8 to monitor, snoop, or access data from the respective bus to maintain cache consistency.

Still referring to FIG. 2, CC 6 contains a cache invalidation queue (CIQ) buffer 20 coupled to MP bus interface and control unit 19 for storing physical addresses of cache subblocks affected during read-invalidate and write-invalidate operations issued by CPU 2. The function of cache invalidation queue buffer 20, constructed according to known design principles, will be explained in more detail below. Also as illustrated in FIG. 2, CC 6 in the preferred embodiment supports two different clock frequencies via an asynchronous interface (indicated by dashed line 70) between CPU bus 4 and MP bus 8. The asynchronous interface 70 permits buses 4 and 8 to operate at different clock frequencies. Decoupling of the operating clocks permits processor 2 to function at a higher speed than, say a system bus (e.g., MP bus 8). In particular, in the preferred embodiment of the present invention, CPU bus 4 operates at a higher frequency than MP bus 8 to accommodate the high speed data transmission rates of high performance processor 2. Buffers 16 and 17 enable communication between devices operating on CPU bus 4 and devices operating on MP bus 8.

It should also be noted that, although the present invention may be practiced in many alternative embodiments, in the presently preferred embodiment of the present invention buffers 16 and 17 are first-in-first-out devices implemented with dual-port register files, operating between the two clock domains CLK1 and CLK2. BIBUF buffer 16 is 16×73 bits in size, whereas REQ request buffer 17a consists of two 10×65 bit structures. The RPY reply buffer 17b consists of three 10×65 bit buffers.

Figure 3:
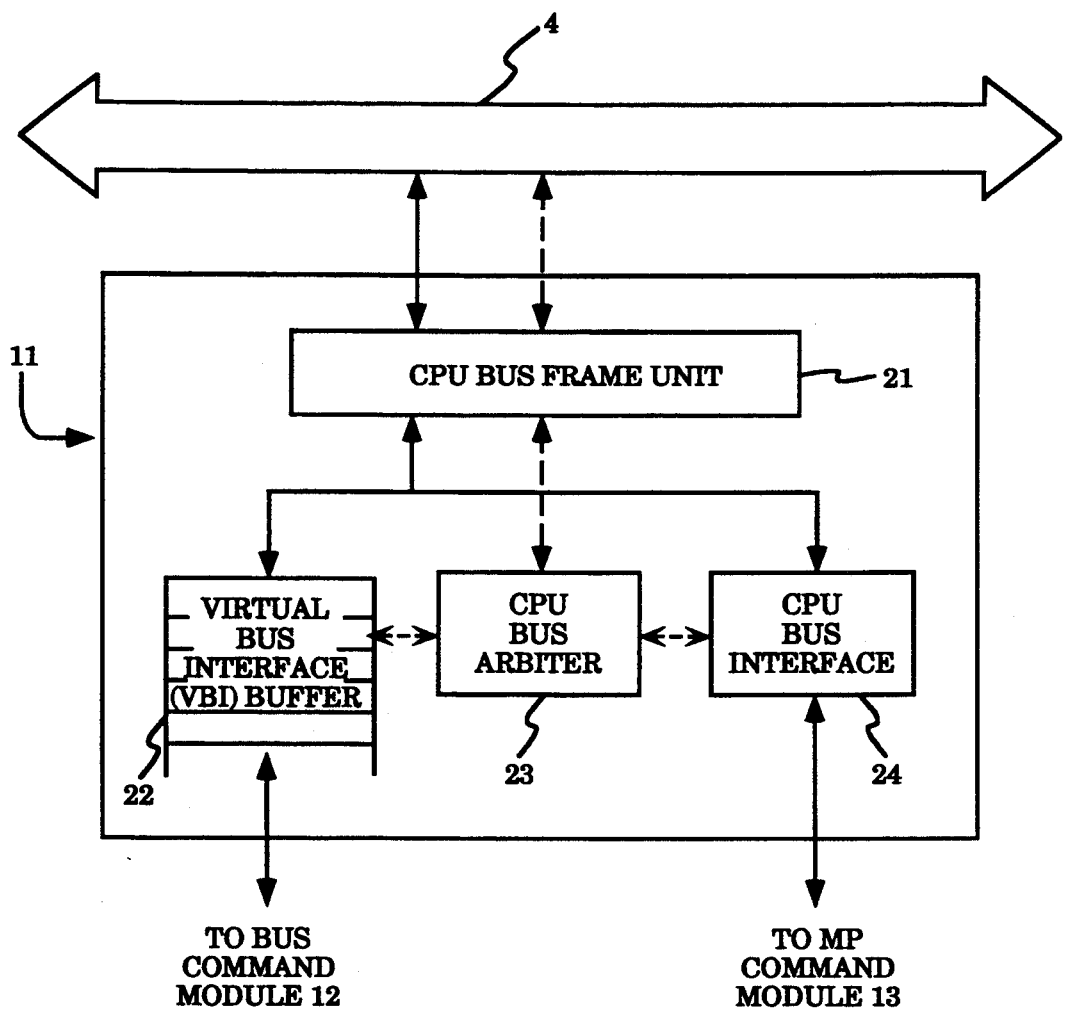
FIG. 3 is a functional block diagram of an integrated address and data bus interface and control unit inside the cache controller.

Reference is now made to FIG. 3. The present invention implements a virtual bus interface (VBI) 22 within the CC 6 to reduce latency of commands directed to CPU 2 operating on the integrated address and data CPU bus 4. The VBI receives entries made in the input buffer, whereafter the input buffer is again free to accept incoming commands, particularly bus snooping requests from devices operating on the MP bus 8. In order to follow consistency protocol for MP bus 8, snooping requests must be service within specified time constraints. In FIG. 3, a more detailed illustration of CPU bus interface and control unit 11, including virtual bus interface (VBI) 22, is shown. In FIG. 3, CPU bus interface and control unit 11 includes a CPU bus input/output (I/O) frame unit 21. CPU bus I/O frame unit 21 contains all drivers, receivers, and latches for outgoing and incoming signals from bus 4, virtual bus interface 22, a CPU bus arbiter 23, and a CPU bus interface 24. Virtual bus interface 22 permits the MP command module 12 to freely write to external cache arrangement 5 (shown in FIG. 1) without requiring arbitration. Rather, VBI 22 provides an illusion of a constantly free CPU bus 4, relieving MP command module 12 from dealing with complexities associated with the CPU bus 4 arbitration protocol. VBI 22 in the preferred embodiment consists of a 9×107 bit buffer to buffer up to nine cycles of CPU bus 4 accesses made through VBI 22 by MP command module 12. Snooping requests sourced from bus 8 are handled by VBI 22 in seven clock cycles. CPU bus arbiter 23 controls and grants requests for access to CPU bus 4 by processor 2, CPU bus interface 24, or VBI 22. CPU bus arbiter 23 also regulates bus protocol used for CPU bus 4. Finally, CPU bus interface 24 internally latches all input signals received from CPU bus 4 before passing the signals to other devices within CC 6.

As described in connection with FIGS. 1, 2, and 3, CC 6 controls external cache arrangement 15 for a computer system incorporating multiple CPUs 2, e.g., those contained within several of processor modules 10 interconnected on MP bus 8. CC 6 further provides a communications interface between the multiple CPUs 2 and the remainder of the computer system. In the preferred embodiment of the present invention, CC 6 can support two different bus systems which use external cache memory structures: MBus-based systems and Dynabus-based systems. In the MBus-based system, CC 6 is directly connected to an MBus configuration (shown as bus 8 in FIGS. 1 and 2). Alternatively, in the Dynabus-based system, CC 6 is connected to an XBus configuration. Because the MBus system is well known, and because the Dynabus system is a packet-switch MP bus whose packet switch operation and characteristics are also well known and described in the art, these bus systems will not be further discussed.

The external cache arrangement 5 is organized as a direct-map cache. The size may be 1 megabyte (MB), or optionally 2 MB in the case of a Dynabus-based system. The size of the external cache arrangement is larger in the Dynabus arrangement than in the MBus arrangement, due to the use of larger subblock size in Dynabus bus implementations. However, the specific attributes of the present invention are dependent of the bus system selected, and, therefor, for the balance of this detailed description only the MBus configuration will be described. Further, because the organization of the cache is identical in both bus implementations except for size, the balance of the detailed description will use the 1 MB cache construct. To implement the 1 MB cache in the preferred embodiment, eight (8) 128K×9 (or 128K×8) static random access memory (SRAM) chips are used. Subblocking is used to reduce the size of cache directory 15 within CC 6, as is generally known. Subblocking was developed to overcome the large bandwidth requirement of large blocks, and also to reduce the tag storage requirements within small cache blocks. As presently preferred, the subblock size is 32 bytes (B) for the MBus-based system. Stored data is transferred, and cache consistency protocol is maintained, on the subblock basis.

CC 6 incorporates the teachings disclosed in the above-referenced concurrently filed related U.S. patent application Ser. No. 07/876,359 entitled "Methods and Apparatus for Providing Multiple Pending Operations in a Cache Consistent Multiple Processor Computer System", filed on Apr. 29, 1992, which is hereby incorporated by reference. The present invention can support pipelined access to the external cache arrangement 5 from any processor interconnected to CC 6 via CPU bus 4. In the presently preferred embodiment, a peak data transfer rate of one double-word (DW) per instruction cycle for both read and write operations is expected. When a read access or write access operation results in a miss, that is, the data or instruction sought is not within the blocks stored in cache arrangement 4, CPU 2 can still access the cache arrangement for a write (or read) operation, until another miss occurs.

Figure 4:
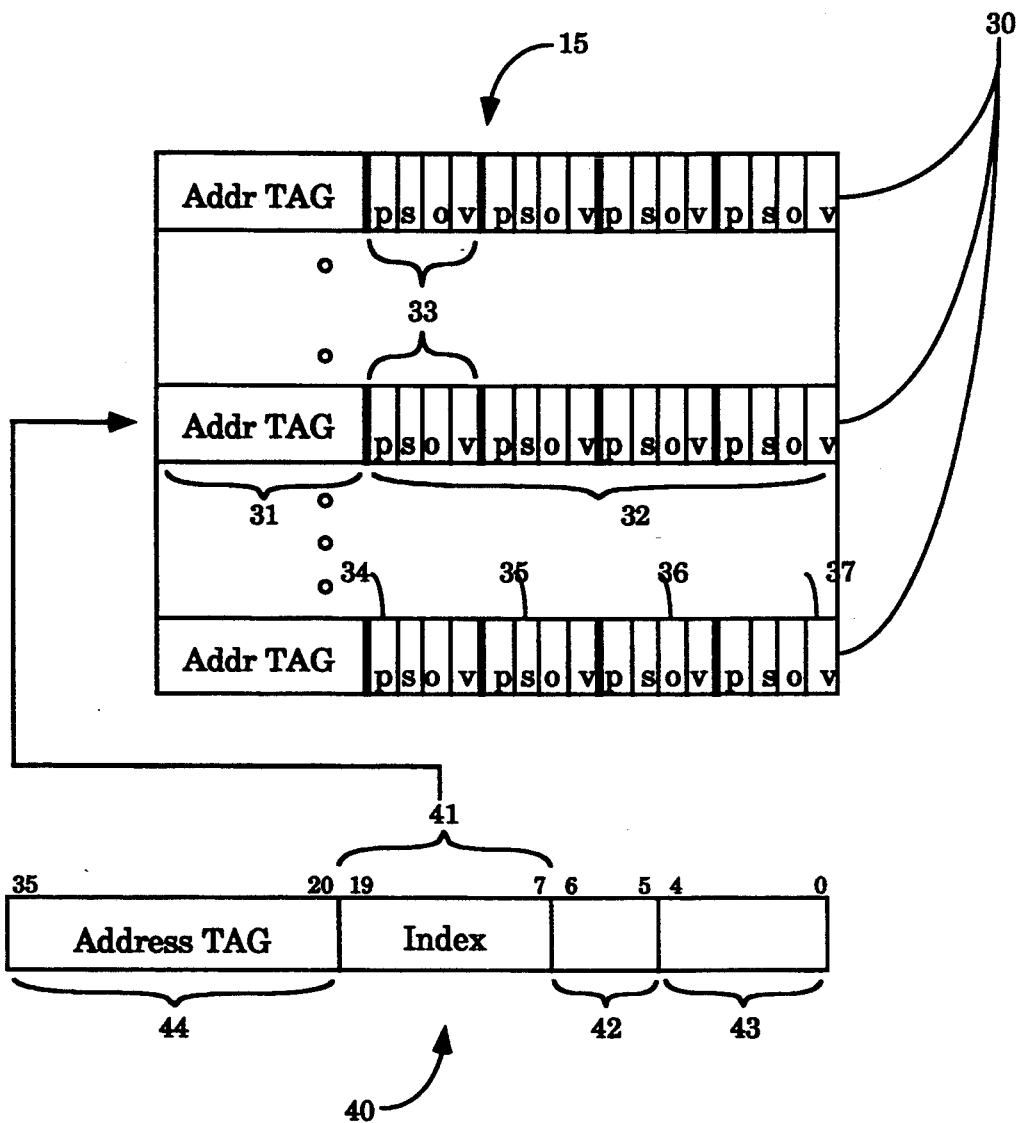
FIG. 4 is a functional block diagram of the cache directory, illustrating an exemplary directory entry selected by an index.

Reference is now made to FIG. 4, wherein a more detailed illustration of cache directory 15 is shown. In FIG. 4, cache directory 15 is constructed as is generally known in the art, having a multiplicity of tag entries 30. There is one entry for each block in the cache arrangement 5. As set out above, the cache arrangement 5 in the preferred embodiment consists of nominally 8K blocks, each 128 B in size. Therefore, cache directory 15 will similarly have 8K tag entries 30. Each tag entry 30 consists of an address tag 31, and a multiplicity of status bit fields 32. The address tag 31 stores the address tag for the data referenced by the particular block identified by tag entry 30. The status bit fields 32 correspond to the subblock present in the block referenced by entry 30. In particular, there is one status bit field 32 for each subblock comprising the block, and there is only a single address tag 31 identifying the several subblocks in that block.

Each status bit field 32 stores four status bits 33: a p-bit 34, an s-bit 35, an o-bit 36, and a v-bit 37. The s-bit 35, o-bit 36, v-bit 37, and p-bit 34 are, respectively, a shared-bit, an owner-bit, an valid-bit, and a pending-bit. S-bit 35 when set indicates that the corresponding subblock is shared. O-bit 36 when set indicates that a particular CPU 2 executed the most recent write operation. V-bit when set indicates the corresponding subblock is valid. P-bit 34 when set indicates that an operation assigned by a CPU 2 is pending on the subblock of the block referenced by the index 40 and the subblock index 42. P-bit 34 is also set when a prefetch operation is initiated. P-bit 34 permits multiple operations to be assigned to subblocks without waiting for completion of previously issued commands, while still only requiring a single address tag to identify all subblocks. P-bit 34 prevents access to a subblock for which p-bit 34 is set by enabling CC 6 to require an accessing CPU to relinquish the bus 4, and "retry" the access later. By having CC 6 monitor p-bit 34, CC 6 will permit a subsequent operation on a subblock having p-bit 34 set only when the previous operation is completed and p-bit 34 cleared. If CPU 2 accesses a subblock whose p-bit 34 is not set and the access results in a miss, then the p-bit 34 is first set, a memory access is made to retrieve data to cache arrangement 5, and the address tag bits 31 are updated accordingly.

Cache block frames within cache arrangement 5 are accessed via an index 41 forming part of an address 40. Address 40 thereby enables access to cache arrangement 5 in a known manner: index 41 essentially points to the particular tag entry 30 according to bit pattern of index 41. Additionally, offsets within block and subblocks are indicated by offset fields 42 and 43.

In operation of the present invention, bus snooping requests can be asserted and proceed entirely independently from the commands issued from and to CPU bus 4 and MP bus 8. Although bus instructions can only be handled consecutively by MP command module 12 and CPU command module 13, BIBUF 16 and BOBUF 17 enable the received commands to be immediately buffered. Further, virtual bus interface 22 enables MP command module 12 to essentially freely write to cache arrangement 5, without interacting with the CPU bus arbiter 23 for CPU bus 4, thereby permitting bus snoop requests to be processed in a guaranteed time by MP command module 12. Cache accesses are thus processed in a substantially pipelined fashion, wherein access requests are issued one at a time, but where a subsequent request may be issued prior to completion of a previously issued cache memory access.

Figure 5:
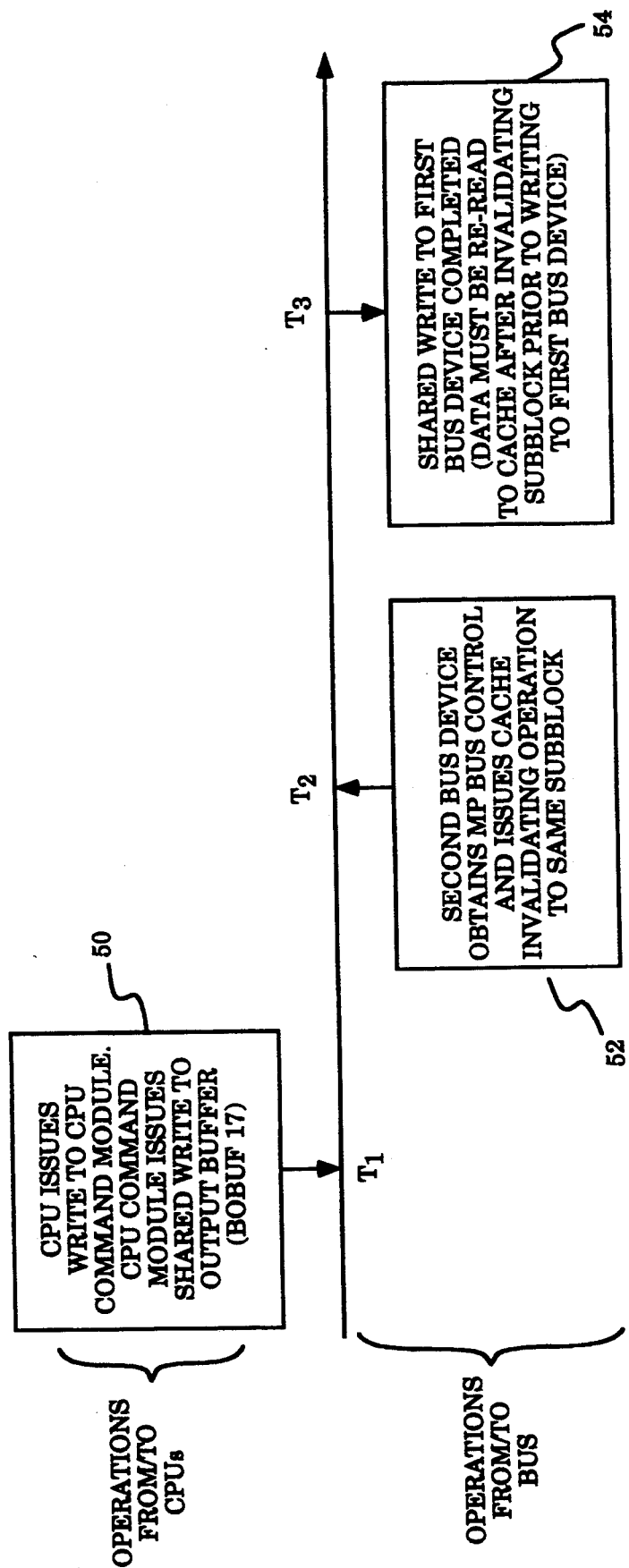
FIG. 5 is a time line showing an exemplary sequence of cache invalidating access operations.

Operation of CC 6 incorporating the present invention may be best explained in association with the illustrated example shown in FIG. 5. In FIG. 5, for example, CPU 2 operating on CPU bus 4 is shown to issue a write operation at time $T_1$, which operation results in a shared-write cache memory access to subblock A, since the issued operation is a write and the share-bit (s-bit) 35 for subblock A is set. Pending bit (p-bit) 34 being set indicates that subblock A of cache arrangement 5 has an operation pending. A shared-write command and associated subblock address will then be written into BOBUF 17. However, pending completion of the memory access associated with the CPU write operation initiated at $T_1$, further operations on other subblocks within the same block may still proceed at times subsequent to $T_1$. Further, assume that at some later time $T_2$, a device operating on MP bus 8 arbitrates for and obtains control of bus 8, and thereafter issues some cache invalidating operation directed to subblock A. The cache invalidating operation issued by the bus 8 device at time $T_2$ will invalidate data previously written to subblock A.

At time $T_3$, the shared-write to cache arrangement 5 is completed. However, the data written at $T_1$ must again be restored in subblock A. In other words, the data must reread because the bus 8 device accessing subblock A at $T_2$ invalidated, subblock A. Therefore, an alternative instruction, "coherent-read-invalidate" (CRI), is issued which rereads the data to subblock A. When the retrieved data is reread and written into cache arrangement 5, the p-bit 34 is cleared and CPU 2 is permitted proceed with the write operation.

Referring again to FIG. 2, cache invalidation queue (CIQ) buffer 20 enables determining when a prior-occurring cache invalidating instruction has invalidated data in particular cache subblocks, and when cache invalidating operations are to be issued on MP bus 8 to the same subblocks subsequent to bus invalidating operations. CIQ buffer 20 stores addresses of cache subblocks to which bus invalidating operations are directed. Because the prior-issued operation is pending and not yet complete, the pending (non-completed) command together with the corresponding block address also will be stored in BOBUF REQ buffer 17a until the necessary destination device address has been fetched from the cache directory 115. Entries stored in BOBUF REQ buffer 17a are compared to entries stored in CIQ buffer 20 via a match logic unit 75. If the address in CIQ buffer 20 matches the address stored in BOBUF REQ buffer 17a, CC 6 will have determined that an intervening cache-invalidating operation has occurred on subblock A, and that the operation directed to the MP bus 8 device must comprise a coherent-read-invalidate (CRI) operation to subblock A, rather than a standard invalidate operation, thus rereading the data. An entry in CIQ buffer 20 remain valid unil MP command module 12 indicates the the entry has been invalidated in the cache directory 15.

The foregoing has described apparatus and methods for preserving multiple outstanding operations in a cache memory structure. It is contemplated that changes and modifications may be made by one of ordinary skill in the art, to the device components and arrangements of elements of the present invention without departing from the spirit and scope of the invention.

We claim:

1. In a computer system comprising processor modules including a central processing unit (CPU), computer devices, and a main memory, a single copy cache tag cache memory structure comprising:
    a cache intercoupled to said CPU by a first bus, said cache comprising a plurality of blocks further comprising a plurality of subblocks, and,
    a cache controller coupled to said first bus and said cache, said cache controller further comprising:
        a cache directory coupled to said cache and said CPU by said first bus, said main memory coupled to said cache controller by a second bus, said computer devices coupled to said cache controller by said second bus;
        a plurality of tag entries comprising address tags, said plurality of tag entries further comprising a plurality of status bit fields corresponding to said subblocks, said tag entries pointed to by a cache directory index comprising a cache directory index field of a physical address;
        first bus interface and control means coupled to said first bus for controlling data transfer on said first bus;
        second bus interface and control means coupled to said second bus for controlling data transfer on said second bus;
        a first bus command module for routing a plurality of second bus access requests issued from said CPU directed to said second bus, said first bus command module coupled to said first bus interface and control means;
        a second bus command module for routing a plurality of first bus access requests issued from said computer devices coupled to the second bus and from said main memory directed to said first bus, said second bus command module coupled to said first bus interface and control means;
        first buffer means coupled to said first and second bus command modules and to said second bus interface and control means for buffering commands directed by said CC to said second bus; and,
        second buffer means coupled to said second bus command module and to said second bus interface and control means for buffering commands directed by said second bus to said CPUs operating on said first bus.

2. The single copy cache tag cache memory structure as set forth in claim 1, wherein said first buffer means further comprises:
    a first buffer coupled to said first bus command module and receiving request commands directed from said first bus to said computer devices operating on said second bus, including said main memory; and,
    a second buffer coupled to said second bus command module and receiving reply commands directed by said CC to said computer devices operating on said second bus, including said main memory.

3. The single copy cache tag cache memory structure as set forth in claim 2, wherein said first buffer means further comprises a local data bus coupled to receive said request and reply commands buffered by said first and second buffers, said local data bus further coupled to said second bus command module and transmitting said reply commands to said computer devices operating on said second bus, including said main memory.

4. The single copy cache tag cache memory structure as set forth in claim 3, wherein said second buffer means further comprises:
    a third buffer coupled to said second bus command module for receiving said request commands directed to said CPUs and said CC by devices operating on said second bus, including said main memory.

5. The single copy cache tag cache memory structure as set forth in claim 4, wherein:
    said first buffer comprises two $10 \times 65$ bit registers;
    said second buffer comprises three $10 \times 65$ bit registers;
    said third buffer comprises ten 73 bit registers.

6. The single copy cache tag cache memory structure as set forth in claim 5, wherein said first bus command module further comprises:
    first bus interface means coupled to said first bus command module for communicating with said first bus;
    first bus arbitration means coupled to said first bus for controlling access to said first bus; and, virtual bus interface means coupled to said first bus and said first and second bus command modules for reducing latency of first commands directed to said CPU.

7. The single copy cache tag cache memory structure as set forth in claim 6, wherein said virtual bus interface means comprises a fourth buffer coupled to said second bus command module;

said fourth buffer receiving a plurality of first commands directed to said CPU by said computer devices operating on said second bus;

said fourth buffer, after receiving said first commands directed to said CPU, buffering said first commands until control of said first bus is granted to said first bus command module by said first bus arbitration means, said fourth buffer thereafter redirecting said first commands to said CPU.

8. The single copy cache tag cache memory structure as set forth in claim 7, wherein said virtual bus interface means comprises nine 107 bit registers.

9. The single copy cache tag cache memory structure as set forth in claim 8 further comprising cache invalidation queue means for determining when a prior-occurring cache invalidating instruction has overwritten data in a particular subblock;

said cache invalidation queue means coupled to said cache directory and storing the addresses of subblocks to which are directed a plurality of shared-access operations issued by said CPUs;

said cache invalidation queue means further coupled to said second buffer means; said second buffer means storing, in said second buffer, addresses of a plurality of destination devices operating on said second bus associated with said shared-access operations;

when said addresses of said destination devices matches said the address of said particular subblock, said cache invalidation queue means signalling said cache controller to fill said particular subblock with data that existed prior to said cache invalidating instruction before completing said shared-access operation to said destination device.

10. The single copy cache tag cache memory structure as set forth in claim 9, wherein said cache invalidation queue means comprises a fifth buffer.

11. In a computer system comprising processor modules including a central processing unit (CPU), computer devices, and a main memory, a single copy cache tag cache memory structure comprising:

a cache intercoupled to said CPU by a first bus, said cache comprising a plurality of blocks further comprising a plurality of subblocks, and, a cache controller coupled to said first bus and said cache, said cache controller further comprising:

a cache directory coupled to said cache and said CPU by said first bus, said main memory coupled to said cache controller by a second bus, said computer devices coupled to said cache controller by said second bus;

a plurality of tag entries comprising address tags, said plurality of tag entries further comprising a plurality of status bit fields corresponding to said subblocks, said tag entries pointed to by a cache directory index comprising a cache directory index field of a physical address;

first bus interface and control means coupled to said first bus for controlling data transfer on said first bus;

second bus interface and control means coupled to said second bus for controlling data transfer on said second bus;

a first bus command module for routing a plurality of second bus access requests issued from said CPU directed to said second bus, said first bus command module coupled to said first bus interface and control means;

wherein said first bus command module further comprises:

first bus interface means coupled to said first bus command module for communicating with said first bus;

first bus arbitration means coupled to said first bus for controlling access to said first bus;

virtual bus interface means coupled to said first bus and said first and second bus command modules for reducing latency of first commands directed to said CPU;

wherein said virtual bus interface means comprises a fourth buffer coupled to said second bus command module;

said fourth buffer receiving a plurality of said first commands directed to said CPU by said computer devices operating on said second bus;

said fourth buffer, after receiving said first commands directed to said CPU, buffering said first commands until control of said first bus is granted to said first bus command module by said first bus arbitration means, said fourth buffer thereafter redirecting said first commands to said CPU;

a second bus command module for routing a plurality of first bus access requests issued from said computer devices coupled to the second bus and from said main memory directed to said first bus, said second bus command module coupled to said first bus interface and control means;

first buffer means coupled to said first and second bus command modules and to said second bus interface and control means for buffering commands directed by said CC to said second bus;

wherein said first buffer means further comprises:

a first buffer coupled to said first bus command module and receiving request commands directed from said first bus to said computer devices operating on said second bus, including said main memory;

a second buffer coupled to said second bus command module and receiving reply commands directed by said CC to said computer devices operating on said second bus, including said main memory;

wherein said first buffer means further comprises a local data bus coupled to receive said request and reply commands buffered by said first and second buffers, said local data bus further coupled to said second bus command module and transmitting said reply commands to said computer devices operating on said second bus, including said main memory;

second buffer means coupled to said second bus command module and to said second bus interface and control means for buffering commands directed by said second bus to said CPU's operating on said first bus;

wherein said second buffer means further comprises:

a third buffer coupled to said second bus command module for receiving said request commands directed to said CPUs and said CC by devices operating on said second bus, including said main memory;

wherein cache invalidating queue means for determining when a prior-occurring cache invalidating instruction has invalidated data in a particular subblock;

said cache invalidation queue means coupled to said second bus interface and control means and storing the addresses of subblocks to which are directed a plurality of shared-access operations;

said cache invalidation queue means further coupled to said second buffer means;

said second buffer means storing, in said second buffer, addresses of a plurality of destination devices operating on said second bus associated with said shared-access operations;

a match logic unit for comparing entries in said cache invalidation queue means and said second buffer means, said match logic unit coupled to said cache invalidation queue means and said second buffer means;

when said addresses of said destination devices matches said the address of said particular subblock, said cache invalidation queue means signaling said cache controller to fill said particular subblock with data that existed prior to said cache invalidating instruction, before completing said shared-access operation to said destination device;

receiving in said fourth buffer a plurality of first commands directed to said CPU by said devices operating on said second bus; and, after receiving said first commands directed to said CPU, buffering said first commands in said fourth buffer until control of said first bus is granted to said first bus command module by said first bus arbitration means, said fourth buffer thereafter redirecting said first commands to said CPU.

12. In a computer system comprising processor modules including a central processing unit (CPU), computer devices, and a main memory, a single copy cache tag cache memory structure comprising:

a cache intercoupled to said CPU by a first bus, said cache comprising a plurality of blocks further comprising a plurality of subblocks, and, a cache controller coupled to said first bus and said cache, said cache controller further comprising:

a cache directory coupled to said cache and said CPU by said first bus, said main memory coupled to said cache controller by a second bus, said computer devices coupled to said cache controller by said second bus;

a plurality of tag entries comprising address tags, said plurality of tag entries further comprising a plurality of status bit fields corresponding to said subblocks, said tag entries pointed to by a cache directory index comprising a cache directory index field of a physical address;

first bus interface and control means coupled to said first bus for controlling data transfer on said first bus;

second bus interface and control means coupled to said second bus for controlling data transfer on said second bus;

a first bus command module for routing a plurality of second bus access requests issued from said CPU directed to said second bus, said first bus command module coupled to said first bus interface and control means;

wherein said first bus command module further comprises:

first bus interface means coupled to said first bus command module for communicating with said first bus;

first bus arbitration means coupled to said first bus for controlling access to said first bus;

virtual bus interface means coupled to said first bus and said first and second bus command modules for reducing latency of first commands directed to said CPU;

wherein said virtual bus interface means comprises a fourth buffer coupled to said second bus command module;

said fourth buffer receiving a plurality of said first commands directed to said CPU by said computer devices operating on said second bus;

said fourth buffer, after receiving said first commands directed to said CPU, buffering said first commands until control of said first bus is granted to said first bus command module by said first bus arbitration means, said fourth buffer thereafter redirecting said first commands to said CPU;

a second bus command module for routing a plurality of first bus access requests issued from said computer devices coupled to the second bus and from said main memory directed to said first bus, said second bus command module coupled to said first bus interface and control means;

first buffer means coupled to said first and second bus command modules and to said second bus interface and control means for buffering commands directed by said CC to said second bus;

wherein said first buffer means further comprises:

a first buffer coupled to said first bus command module and receiving request commands directed from said first bus to said computer devices operating on said second bus, including said main memory;

a second buffer coupled to said second bus command module and receiving reply commands directed by said CC to said computer devices operating on said second bus, including said main memory;

wherein said first buffer means further comprises a local data bus coupled to receive said request and reply commands buffered by said first and second buffers, said local data bus further coupled to said second bus command module and transmitting said reply commands to said computer devices operating on said second bus, including said main memory;

second buffer means coupled to said second bus command module and to said second bus interface and control means for buffering commands directed by said second bus to said CPUs operating on said first bus;

wherein said second buffer means further comprises:

a third buffer coupled to said second bus command module for receiving said request commands directed to said CPUs and said CC by devices operating on said second bus, including said main memory;

wherein cache invalidating queue means for determining when a prior-occurring cache invalidating instruction has invalidated data in a particular subblock;

said cache invalidation queue means coupled to said second bus interface and control means and storing the addresses of subblocks to which are directed a plurality of shared-access operations;

said cache invalidation queue means further coupled to said second buffer means;

said second buffer means storing, in said second buffer, addresses of a plurality of destination devices operating on said second bus associated with said shared-access operations;

a match logic unit for comparing entries in said cache invalidation queue means and said second buffer means, said match logic unit coupled to said cache invalidation queue means and said second buffer means;

when said addresses of said destination devices matches said the address of said particular subblock, said cache invalidation queue means signaling said cache controller to fill said particular subblock with data that existed prior to said cache invalidating instruction, before completing said shared-access operation to said destination device;

receiving in said fourth buffer a plurality of first commands directed to said CPU by said devices operating on said second bus;

after receiving said first commands directed to said CPU, buffering said first commands in said fourth buffer until control of said first bus is granted to said first bus command module by said first bus arbitration means, said fourth buffer thereafter redirecting said first commands to said CPU;

a method of determining when a prior-occurring cache invalidating instruction has overwritten data in a particular subblock; comprising the steps of;

storing in said cache invalidation queue means the addresses of subblocks to which are directed a plurality of shared-access operations;

storing, in said second buffer, addresses of a plurality of destination devices operating on said second bus associated with said shared-access operations; and, comparing entries in said cache invalidation queue means and said second buffer means with said match logic unit coupled to said cache invalidation queue means and said second buffer means;

when said addresses of said destination devices matches said address of said particular subblock, signaling said cache controller to fill said particular subblock with data that existed prior to said cache invalidating instruction, before completing said shared-access operating to said destination device.

* * * * *

UNITED STATES PATENT AND TRADEMARK OFFICE
CERTIFICATE OF CORRECTION

PATENT NO.   : 5,398,325
DATED        : March 14, 1995
INVENTOR(S)  : Chang et al.

It is certified that error appears in the above-identified patent and that said Letters Patent is hereby corrected as shown below:

In column 11, claim 7 at line 9, please delete " of first " and insert -- of said first --.

Signed and Sealed this

Ninth Day of February, 1999

Attest:

Attesting Officer

*Acting Commissioner of Patents and Trademarks*